(12) United States Patent
Coffield et al.

(10) Patent No.: US 7,441,758 B2
(45) Date of Patent: Oct. 28, 2008

(54) LOAD BEARING SURFACE

(75) Inventors: Timothy P. Coffield, Grand Rapids, MI (US); Daniel S. Sommerfeld, Kalamazoo, MI (US); Joseph D. Ward, Grand Rapids, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/112,345

(22) Filed: Apr. 22, 2005

(65) Prior Publication Data

US 2005/0279591 A1    Dec. 22, 2005

Related U.S. Application Data

(60) Provisional application No. 60/580,648, filed on Jun. 17, 2004.

(51) Int. Cl.
*A47C 23/00* (2006.01)
(52) U.S. Cl. .................. 267/142; 297/452.15; 428/185
(58) Field of Classification Search ......... 267/142–145, 267/152; 297/452.15, 452.12, 452.14; 428/180, 428/182–185; 5/653, 654; D6/500, 596
See application file for complete search history.

(56) References Cited

U.S. PATENT DOCUMENTS

| | | | |
|---|---|---|---|
| 3,233,885 A | 2/1966 | Propst | |
| 4,399,574 A | 8/1983 | Schuman et al. | |
| 4,713,854 A | 12/1987 | Graebe et al. | |
| 4,826,249 A | 5/1989 | Bradbury et al. | |
| 4,980,936 A | 1/1991 | Frickland et al. | |
| 5,025,519 A | 6/1991 | Spann et al. | |
| 5,459,896 A * | 10/1995 | Raburn et al. | .................. 5/653 |
| D368,399 S * | 4/1996 | Buffon | ........................ D6/500 |
| D486,027 S * | 2/2004 | Baxter et al. | .................. D6/596 |
| 6,726,285 B2 * | 4/2004 | Caruso et al. | ................. 5/652.1 |
| 6,901,617 B2 * | 6/2005 | Sprouse et al. | .................. 5/654 |
| 2005/0116526 A1 | 6/2005 | Vanderiet et al. | |
| 2006/0103222 A1 | 5/2006 | Caruso et al. | |

FOREIGN PATENT DOCUMENTS

| | | |
|---|---|---|
| GB | 2088206 | 6/1982 |
| WO | WO 0115572 | 3/2001 |
| WO | 03/061434 | 7/2003 |

* cited by examiner

*Primary Examiner*—Pam Rodriguez
(74) *Attorney, Agent, or Firm*—Mark W. Croll; Paul F. Donovan

(57) ABSTRACT

An elastomeric load bearing surface with different load support characteristics in different directions. In one embodiment, the surface includes an elastomeric membrane that is oriented in only a single direction, for example, by compression or stretching. In another embodiment, the surface includes mechanical structures, such as connectors, variations in thickness and apertures, that vary the load support characteristics in different directions. In another aspect, the present invention provides a multilayer load bearing surface in which the layers cooperate to provide a controlled force/deflection profile that is variable in different regions of the surface. In one embodiment, the upper layer includes a plurality of loosely connected nodes and a lower layer having a plurality of resilient elements that separately support each node.

11 Claims, 10 Drawing Sheets

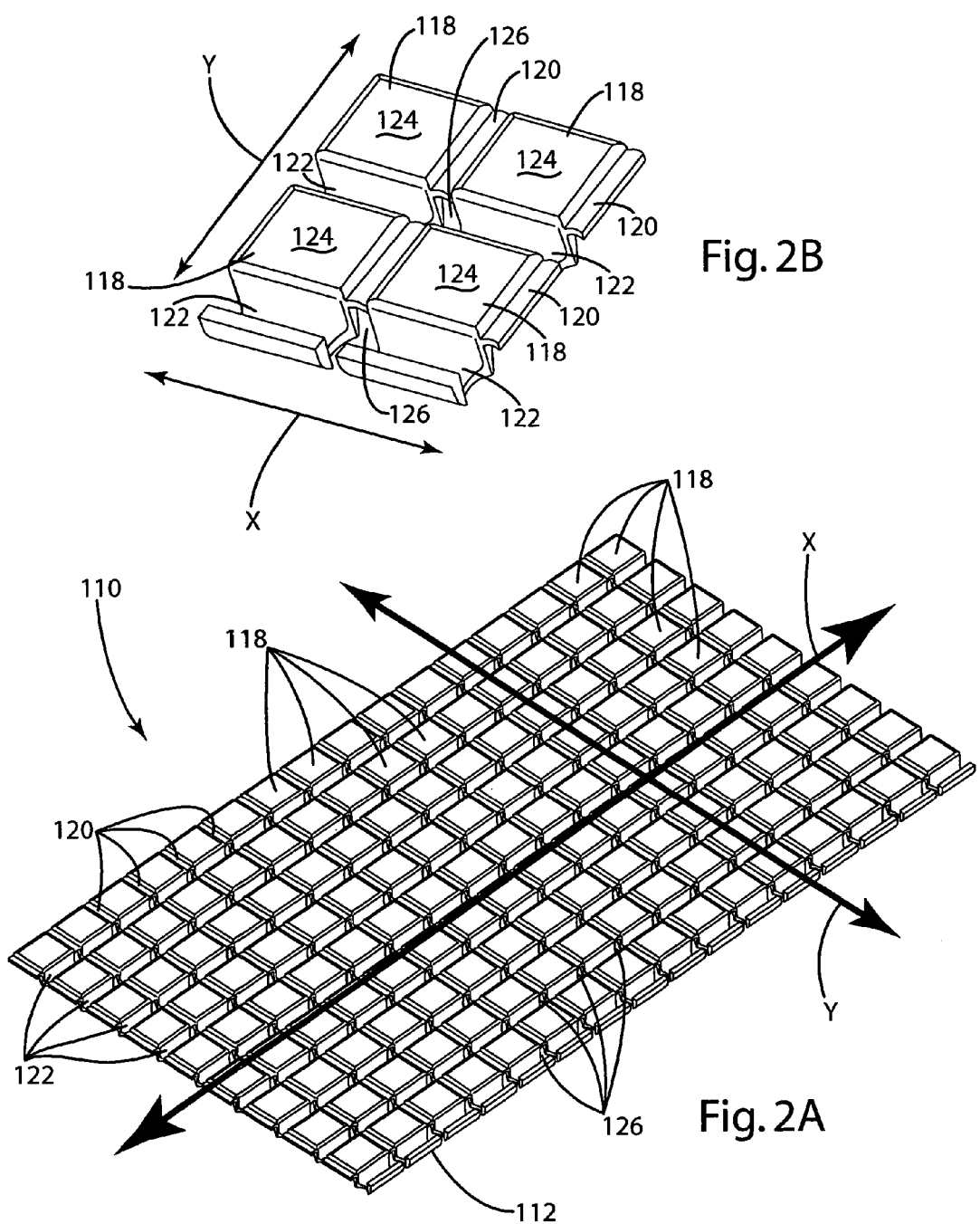

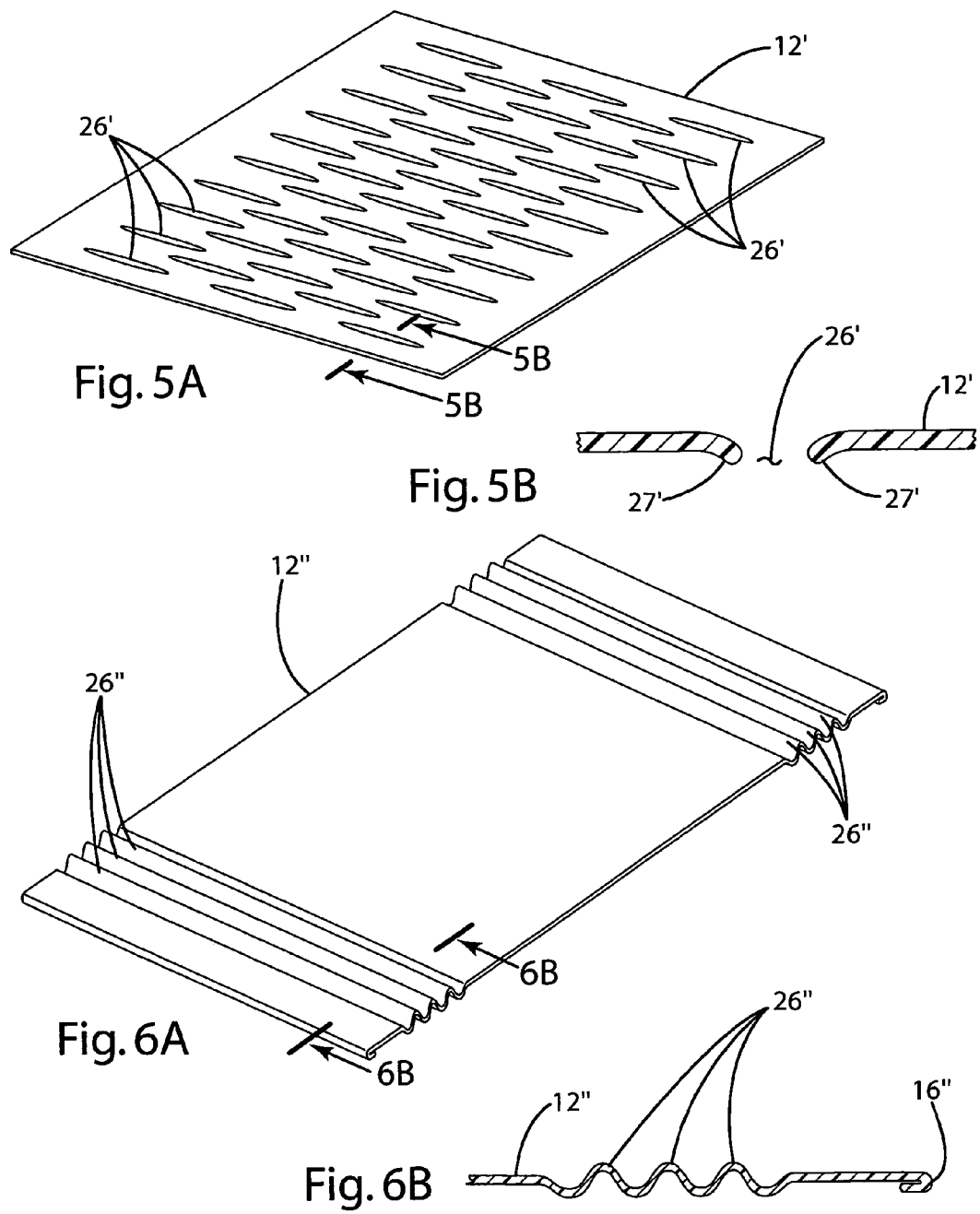

LOAD BEARING SURFACE

This application claims the benefit of U.S. Provisional Application No. 60/580,648, filed Jun. 17, 2004.

BACKGROUND OF THE INVENTION

The present invention relates to load bearing surfaces, and more particularly to elastomeric load bearing surfaces, such as the seat or back of a chair or bench, or the support surface of a bed, cot or other similar product.

There are continuing efforts to develop new and improved load bearing surfaces. In the context of general load bearing surfaces, the primary objectives of these efforts are to obtain a durable and inexpensive load bearing surface. In the context of seating and other body-support applications, it is also important to address comfort issues. For example, with seating, it can be important to provide a surface that is comfortable and does not create body fatigue over periods of extended use. Given that the load characteristics (e.g. stiffness, resiliency, force/deflection profile) desired in a particular surface will vary from application to application, it is also desirable to have a load bearing surface that is easily tunable for different applications during design and manufacture.

It is known to provide molded load bearing surfaces for a wide variety of applications. For example, molded plastic chairs (e.g. lawn chairs) are available from a variety of well known suppliers. Although these molded chairs provide an inexpensive seating option, they do not provide the level of support and comfort available in more expensive load bearing surfaces, such as conventional cushion sets. Rather, they provide an essentially linear force/deflection profile, which gives the typical molded seating surfaces the feel of a drum or a trampoline. In seating and other body-support applications, this may result in an uncomfortable and sometimes ergonomically unacceptable load bearing surface. Further, the ability to tune the characteristics of a conventional molded seat is relatively limited. Different materials and different material thicknesses can be used to provide a limited degree of control over the characteristics of the seat, but this level of control is not sufficient in many applications.

There is also an increasing use of elastomeric fabrics in the seating industry. Elastomeric fabrics can provide a comfortable, ventilated seating structure. Elastomeric fabrics are typically manufactured from a complex weave of high tech elastomeric monofilaments and multifilament yarns. The process results in a relatively expensive surface. Although elastomeric fabric surfaces can be quite comfortable in many applications, they typically deflect like a sling when a load is applied. Some ergonomic specialists refer to this type of deflection as "hammocking" and consider it undesirable because it can cause the hips to rotate upward. To minimize hammocking, many suspension seats are stretched quite tightly to reduce the amount of deflection that occurs under load. This can reduce the cushion-like feel of the seat making it feel more like a tightly stretched drum. As a result, elastomeric fabrics may not be ideal in all applications.

Accordingly, there remains a need for an elastomeric load bearing surface that is capable of providing non-linear force/deflection profile in response to different loads.

SUMMARY OF THE INVENTION

In one aspect, the present invention provides an elastomeric load bearing surface having different support characteristics in different directions. In one embodiment, the support characteristics are varied (or decoupled) in directions that are perpendicular to one another.

In one embodiment of this aspect, the load bearing surface includes a molded elastomeric membrane that is decoupled by affecting the orientation of the structure of the membrane on a molecular level. In this embodiment, the molded elastomeric membrane may be oriented by compressing or stretching the membrane in one direction to the extent necessary to increase the alignment of the crystallize structure of the elastomer. The orientation process varies the support characteristics of the membrane resulting in a membrane with significant elasticity in the direction of orientation and a low level of creep. The orientation process leaves the membrane with minimal elasticity in the direction perpendicular to the oriented direction.

In another embodiment, the molded elastomeric membrane includes mechanical structure that affects the support and load bearing characteristics of the membrane. In this embodiment, the membrane may include without limitation slits, channels, undulations or other integral elements that provide "slack" in one direction. If desired, the membrane may be oriented and include mechanical decoupling structure.

In yet another embodiment, the membrane is segregated into a plurality of nodes that provide a degree of independence from one location on the membrane to another. In one embodiment, the membrane defines a plurality of interconnected geometric shapes. For example, the membrane may include a plurality of square or triangular nodes that are interconnected by integral connector segments. The characteristics of the connector segments may be varied to control the support characteristics of the membrane. For example, the membrane may include non-planar connector segments that can flex or otherwise deform under load to provide the membrane with "slack."

In a second aspect, the present invention provides a multilayer load bearing surface. In an embodiment of this aspect of the present invention, the load bearing surface includes interacting upper and lower layers. The upper layer may include a plurality of loosely connected nodes. In one embodiment, the upper layer is a molded sheet having a plurality of nodes interconnected by integral connector segments. The upper layer may include an integral protrusion extending from each node toward the lower layer. The protrusions may be interfitted with corresponding structure in the lower layer. The multi-layer load bearing surface may also include springs elements disposed between the upper and lower layers. The spring elements may be integral with the upper layer or the lower layer. For example, the lower layer may include a plurality of integrally molded flexible arms adapted to receive the protrusions of the upper layer. In one embodiment, the lower layer may be a decoupled molded elastomeric membrane.

The present invention also provides a method of manufacturing a load bearing surface from an elastomeric material. The method generally includes the steps of (a) molding an elastomeric membrane and (b) orienting the elastomeric membrane in one direction by stretching the elastomeric membrane in that direction or by compressing the elastomeric membrane in such a way as to cause it to flow in that direction. The elastomeric membrane is stretch or compressed to a point where there is an increase in the alignment of the crystalline structure of the elastomeric material in the oriented direction. In one embodiment, the method further includes the step of molding the elastomeric membrane with a structure that mechanically decouples the membrane in a direction different from that in which the membrane is oriented. This decoupled direction may be perpendicular to the oriented direction.

In one embodiment, the membrane is compressed by the steps of (a) constraining the membrane on all sides except those sides corresponding with the desired direction of orientation and (b) applying a compression force to the membrane such that the material of the membrane flows in the unconstrained direction to increase the alignment of the crystalline structure of the membrane in the direction of flow.

The present invention further provides a method of manufacturing a multi-layer load bearing surface. The method generally includes the steps of (a) producing an upper surface having a plurality of nodes interconnected by connector segments, (b) producing a lower layer adapted to interface with the upper layer at the nodes and (c) combining the upper layer and the lower layer with spring elements disposed at the interface locations. In one embodiment, the upper layer includes an integral axel extending from each node and the lower layer includes integral spring arms that receive the axels.

The present invention provides a strong, yet flexible load bearing surface. The elastomeric load bearing surfaces are relatively inexpensive to manufacture, and provide a light weight surface that can be ventilated to inhibit heat retention. The decoupled elastomeric material exhibits support characteristics that are particularly well suited for use in seating applications because it provides different degrees of elasticity and support in different directions. For example, the decoupled elastomeric material can provide a seating structure with elasticity in the left to right direction, but not in the front to back direction. Further, by increasing the alignment of the crystalline structure of the elastomeric material, the level of creep in the membrane can be dramatically reduced. In the two layer embodiments, the second layer provides additional control over up/down (or z-axis) displacement of the load bearing surface. This permits more control over the support and comfort characteristics of the seat.

These and other objects, advantages, and features of the invention will be readily understood and appreciated by reference to the detailed description of the preferred embodiment and the drawings.

BRIEF DESCRIPTION OF THE DRAWINGS

FIG. 2A a perspective view of an alternative load bearing surface having a plurality of nodes.

FIG. 2B is an enlarged perspective view of a portion of the load bearing surface of FIG. 2A.

FIG. 5A is a perspective view of a first alternative load bearing surface.

FIG. 5B is a sectional view of the first alternative load bearing surface taken along line VB-VB.

FIG. 6A is a perspective view of a second alternative load bearing surface.

FIG. 6B is a sectional view of the second alternative load bearing surface taken along line VIB-VIB.

DETAILED DESCRIPTION OF THE PREFERRED EMBODIMENT

Figure 1:
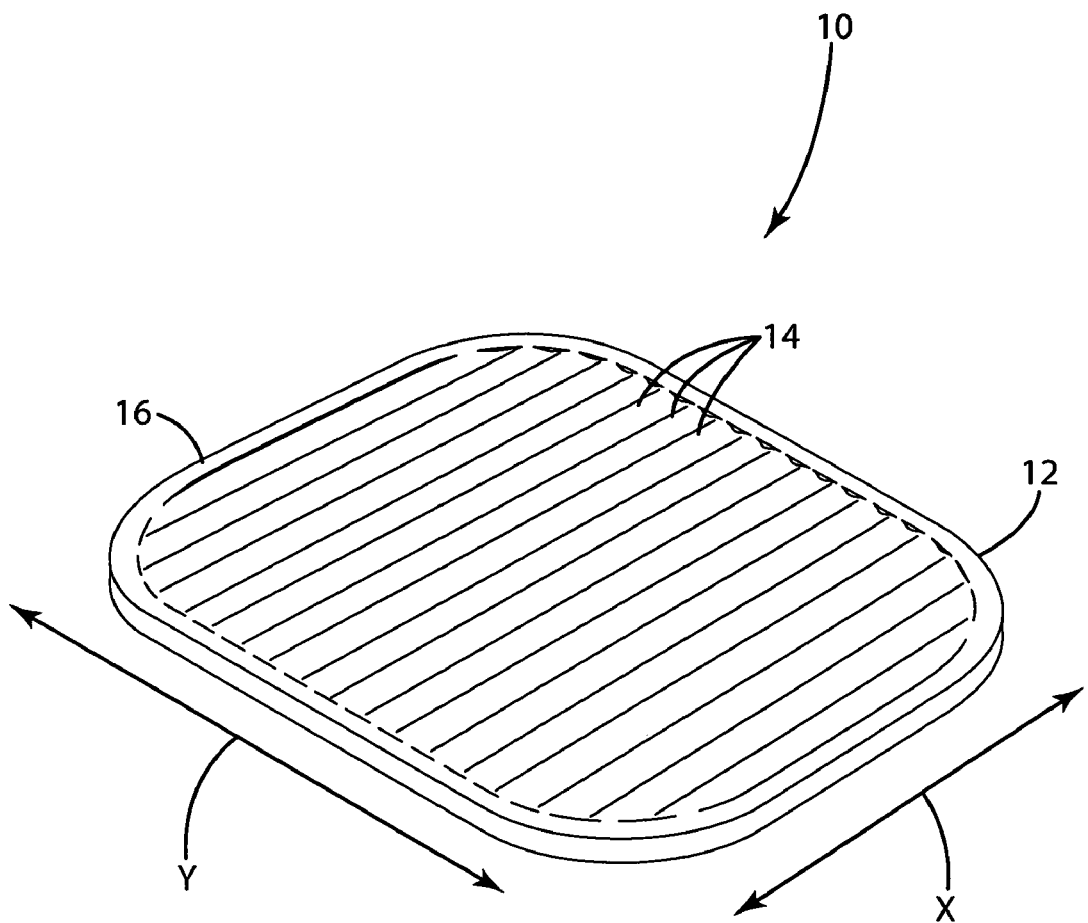
FIG. 1 is a perspective view of a load bearing surface in accordance with one embodiment of the present invention.

A load bearing surface 10 according to one embodiment of the present invention is shown in FIG. 1. The load bearing surface 10 shown in FIG. 1 is a molded membrane that may be suspended from a support structure, such a chair seat frame (not shown). The load bearing surface 10 includes support characteristics that differ in different directions. For example, the load bearing surface may provide significant elastic support in the x direction while providing relatively little support in the y direction. This "decoupling" of the support characteristics of the load bearing surface provides a high degree of comfort. By way of disclosure, the present invention is described in connection with various alternative embodiments intended primarily for use in seating applications. The present invention is not, however, limited to use in seating applications, but may also be incorporated into other load bearing applications. The support characteristics of the molded membrane are highly adjustable, thereby permitting the load bearing surface 10 to be tailored to support a variety of loads in a variety of different applications.

In the embodiment of FIG. 1, the load bearing surface 10 includes a molded elastomeric membrane 12. In the illustrated embodiment, the membrane 12 is molded from a thermoplastic polyether ester elastomer block copolymer. One suitable material of this type is available from DuPont under the Hytrel® trademark. A variety of alternative elastomers may be suitable for use in the present invention. The thickness of the molded membrane 12 will vary from application to application depending primarily on the anticipated load, but the support portion of the membrane may have an average thickness prior to any desired orienting of approximately 20-40 mils in standard seating applications. In one embodiment, the molded membrane 12 is oriented in one direction (i.e. the x direction) to provide creep resistance and elasticity in the direction of orientation. The membrane 12 is oriented by increasing the alignment of the crystalline structure of the elastomeric membrane on a molecular level so that its support and other load bearing characteristics are altered. Typically, the membrane with be oriented to such a degree that the oriented membrane 12 has materially different load bearing characteristics in the oriented direction than in other directions. One method for orienting the membrane 12 is through stretching. The amount of stretch required to obtain the desired alignment will vary from application to application, but in most applications the desired degree of alignment will occur when the membrane is stretched to roughly two times its original dimension. Although the elastomeric membrane 12 may be oriented by stretching the membrane, it may be possible in some application to orient the membrane 12 using other processes. For example, it may be possible to orient certain materials by hammering or other forms of compression, rather than stretching the membrane 12. It should be noted that many elastomeric materials, including molded Hytrel®, have essentially no elasticity and are susceptible to a high degree of creep when in a molded form. The orientation process of the present invention causes a significant change in the properties of the elastomeric material. For example, orientation of the membrane 12 increases the elasticity of the material and decreases its inherent susceptibility to creep. The elastomeric membrane 12 of FIG. 1 also includes a plurality of undulations 14 that provide "slack" in the direction perpendicular to the direction of orientation (i.e. the y direction). When a load is applied to the membrane 12, the undulations 14 can undergo a "flattening" that permits the membrane 12 to expand in the y direction. The undulations 14 and other mechanical decoupling structures are described in more detail below.

Figure 8A:
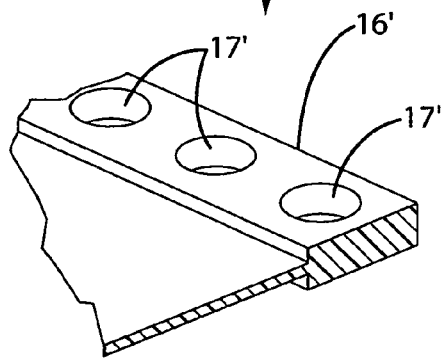
FIG. 8A is an enlarged cross-sectional view of a portion of an elastomeric membrane having an integral edge.
Figure 8B:
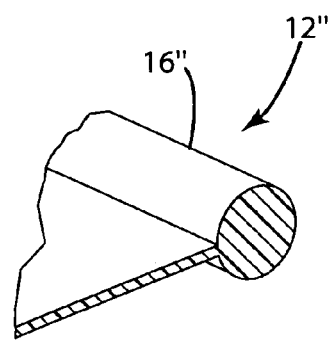
FIG. 8B is a cross-sectional enlarged view of a portion of an elastomeric membrane having a first alternative integral edge.
Figure 8C:
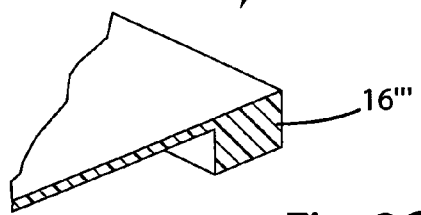
FIG. 8C is an enlarged cross-sectional view of a portion of an elastomeric membrane having a second alternative integral edge.

The membrane 12 of FIG. 1 also includes an integral edge 16 that may be mounted directly to the desired support structure (not shown), such as the seat frame of a chair. In the illustrated embodiment, the edge 16 extends around the periphery of the membrane 12 and is significantly thicker than the remainder of the membrane 12. The edge 16 may include integral snap or other attachment features (not shown) that facilitate attachment of the membrane 12 to the support structure. Alternatively, the edge 16 may be attached using fasteners (not shown), such as screws or bolts. The edge 16 does not necessarily extend entirely around the membrane 12, but may instead include one or more segments located at different locations around the periphery. For example, an edge segment may be located in each corner of a rectangular membrane (not shown). The edge 16 is also not necessarily located on the periphery of the membrane 12. In some application, it may be desirable to have one or more edge segments located within the interior of the membrane 12. For example, in an elongated surface, an edge segment may be included in the central interior of the membrane to provide a central mounting location (not shown). Three alternative edge constructions are shown in FIGS. 8A-C. FIG. 8A shows an edge 16' having holes 17' to facilitate attachment of the edge 16' to a support structure (not shown). For example, fasteners (not shown) may pass through the holes 17'. Alternatively, the holes 17' may be fitted over attachment structure on the support structure (not shown), such as post. FIG. 8B shows an edge 16" that is substantially circular in cross section. FIG. 8C shows an edge 16''' that is substantially square in cross section.

Figures 3A, 3B:
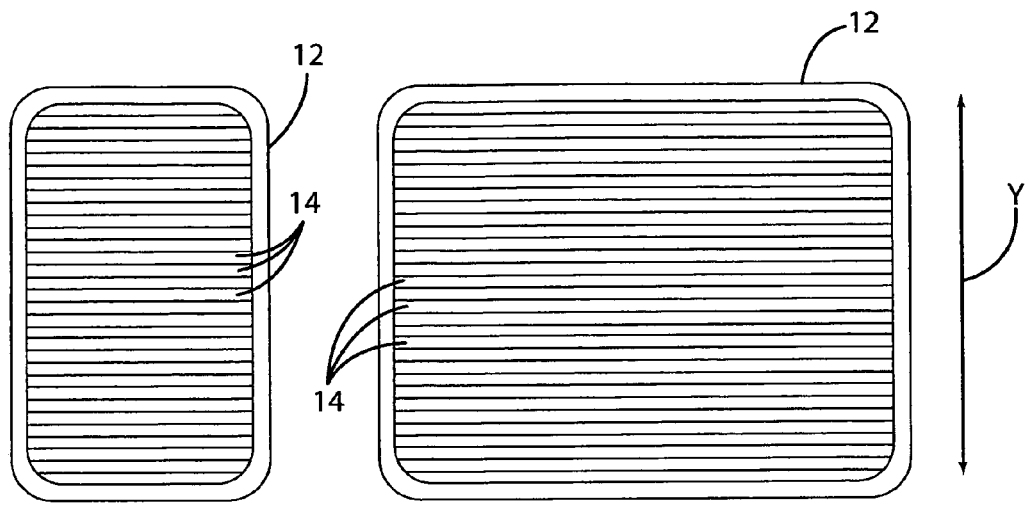
FIG. 3A is a top plan view a molded elastomeric membrane prior to orientation.
FIG. 3B is a top plan view the molded elastomeric membrane during orientation.
Figure 3C:
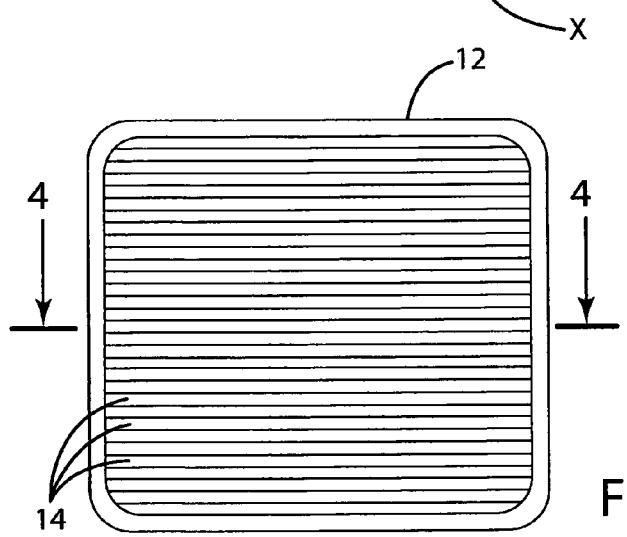
FIG. 3C is a top plan view the molded elastomeric membrane after orientation.
Figure 4:
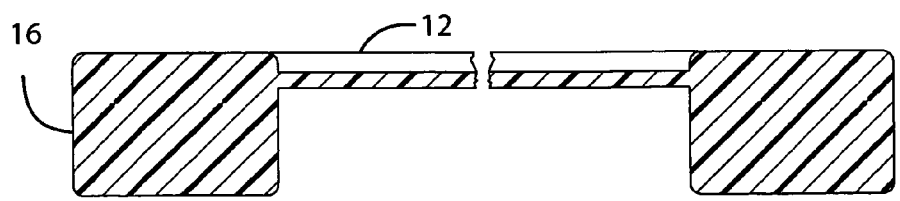
FIG. 4 is a sectional view of the molded elastomeric membrane taken along line IV-IV of FIG. 3C.

As noted above, the elastomeric membrane 12 is molded using conventional techniques and apparatus. For example, the elastomeric membrane 12 may be injection molded using a conventional injection molding apparatus (not shown) having a die that is configured to provide a membrane with the desired shape and features. In this embodiment, the elastomeric membrane 12 is manufactured by injecting the desired material into the die cavity. The die is designed to provide a molded blank (See FIG. 3A) that will take on the desired shape once any desired orientation have taken place. For example, the dies are configured to form a part that will have the desired shape and dimensions after the orientation step is complete. After molded, the molded membrane may be stretched or otherwise oriented in one direction (See FIG. 3B). If orientation is achieved through stretching, the precise amount of stretch to be applied to a given membrane will depend on the configuration of the membrane and the desired support characteristics. In many applications, it will be necessary to stretch the membrane to at least twice it original length to achieve the desired alignment. The membrane may be stretched using conventional techniques and apparatus. As a result of the increase in alignment of the crystalline structure, the membrane 12 will not fully return to its original length after being released from the stretching equipment. Rather, the oriented membrane 12 will be elongated a certain portion of the stretched distance, with the precise amount of elongation being dependent in large part on the material characteristics of the membrane material (See FIG. 3C). Once any desired orientation has taken place, the membrane 12 can be mounted directly to the support structure using essentially any mounting technique. For example, the edge 16 of the membrane (shown in FIG. 4) can be fastened to a support structure by screws or other fasteners. As an alternative to stretching, the membrane 12 may be oriented by compression. In one embodiment for orienting by compression, the membrane 12 is placed in a die or other structure (not shown) that constrains the membrane 12 on all sides other than at least one side that corresponds with the desired direction of orientation. Opposed sides may be unconstrained to permit the material of the membrane 12 to flow from both sides along the direction of orientation. Alternatively, only a single side may be unconstrained, thereby limiting material flow to a single side. A compressive force is then applied to the membrane 12. For example, a press can be used to compress the membrane 12 within the die. Sufficient compressive force is applied so that the material begins to flow in the unconstrained direction. This in effect causes the membrane 12 to extend and its crystalline structure to become increasingly aligned in the direction of orientation. The amount of force applied to the membrane 12 may vary from application depending on the desired degree of alignment or orientation. Although described in connection with orientation of the entire elastomeric membrane 12, in some application it is not necessary to orient the entire membrane 12. Rather, in some application, it may be desirable to orient only select portions of the membrane. For example, in some applications it may be desirable to orient only select peripheral portions of the membrane. When desirable, this may be achieved by applying localized stretching or localized compression of the membrane.

The use of a molded membrane in the present invention provides the ability to easily create textures on the membrane, provide the membrane with essentially any desired contour and vary the thickness of the membrane in different locations. Although not shown, the upper surface of the membrane may be smooth or may be textured to provide the appearance of leather, fabric or other desired textures. Similarly, the upper surface of the membrane may be provided with essentially any conceivable design elements (not shown), such as tiny bumps, corrugations, perforations or a spider web pattern. The use of contours and varying thicknesses across the membrane 12 permits localized control over the support characteristics of the membrane 12. For example, the membrane 12 may be thicker in regions where increased support is desired.

Various alternative embodiments of the present invention will be described in the following paragraphs. In each of these alternative embodiments, the elastomeric membrane may be oriented in one direction to reduce creep and provide the membrane with a desired level of elasticity in the direction of orientation. It is not, however, necessary to orient the membrane in all applications. Rather, in applications where the elasticity and creep resistance provided by orientation are not necessary (or not desirable), variation in the support characteristics of the membrane in different directions may be achieved solely by variations in the structure of the membrane.

An alternative embodiment is shown in FIG. 5A-B. In this embodiment, the membrane 12' defines a plurality of slits or apertures that decouple the stiffness of the membrane in the x and y directions. More specifically, the membrane 12' defines a plurality of apertures 26' that permit a specific amount of extension of the membrane in the desired direction (i.e. the y direction) without significant stretching of the membrane 12'. The apertures 26' may be elongated as shown in FIG. 5A. As shown, the apertures 26' may by staggered across the surface of the membrane 12' with the precise shape, number, location and size of the apertures 26' being dictated primarily by the desired support characteristics. As shown in FIG. 5B, the membrane 12' may be molded with a bead 27' around each aperture 26' to reduce the possibility of tearing. As noted above, the membrane 12' may be oriented in the x direction as described above in connection with membrane 12.

A second alternative embodiment is shown in FIGS. 6A-B. In this embodiment, the membrane 12" includes undulating variations 26" that decouple the stiffness of the membrane 12" by providing "slack" in one direction (e.g. the y direction). As shown in FIG. 6B, the undulating variations 26" may be sinusoidal when viewed in cross-section. Alternatively, the undulating variations 26" may resemble an accordion or pleated configuration when view in cross-section. The undulations may follow essentially any contour that varies in the z direction. In this embodiment, the undulations 26" are arranged parallel to one another. As a result, the undulations 26" cooperate to provide slack in essentially one direction. The undulations 26" may, however, be in a non-parallel arrangement when appropriate to provide the desired support characteristics. The number, size, shape and location of the undulations 26" can be tuned to provide control over the support characteristics of the membrane 12".

Figure 7A:
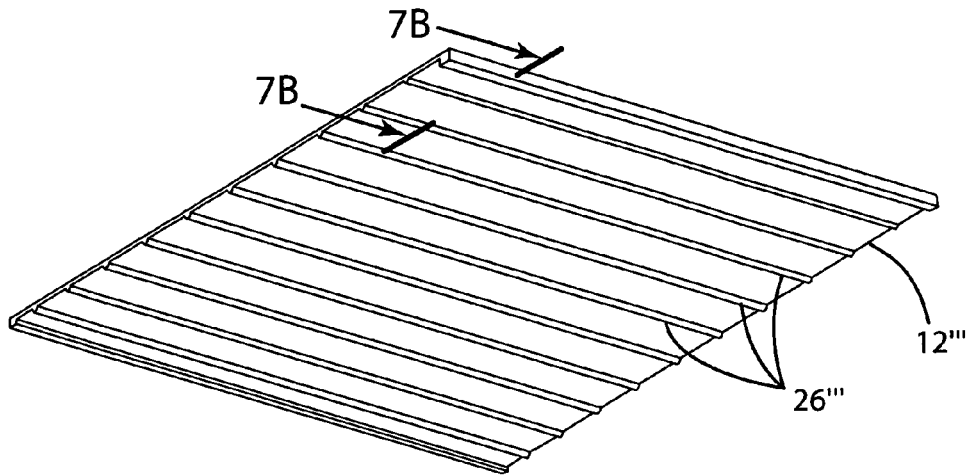
FIG. 7A is a perspective view of a third alternative load bearing surface.
Figure 7B:
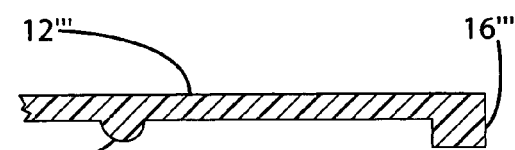
FIG. 7B is a sectional view of the third alternative load bearing surface taken along line VIIB-VIIB.

A third alternative embodiment is shown in FIG. 7A-B. In this embodiment, the membrane 10''' includes a plurality of ribs 26''' extending at least partially across the membrane 12'''. In one embodiment, the membrane 12''' includes a plurality of parallel ribs 26'''. The ribs 26''' provide the membrane 12''' with additional material that reduces the force required to stretch the membrane 12''' in the direction perpendicular to the ribs 26''' (i.e. the y direction), while at the same time having little effect on the force required to stretch the membrane 12''' in the direction parallel to the ribs (i.e. the x direction). The number, size, shape and location of the ribs 26''' can be tuned to provide control over the support characteristics of the membrane 12'''.

The load bearing surface may optionally be divided into a plurality of nodes. The molded elastomeric membrane 112 shown in FIGS. 2A-B includes a plurality nodes 118 interconnected by a plurality of connector segments 120, 122. As perhaps best shown in FIG. 2B, the nodes 118 and connector segments 120, 122 are integrally formed as a single molded part. In the embodiment of FIGS. 2A-B, the membrane 112 includes a plurality of substantially square, equal-sized, regularly-spaced nodes 118. The nodes 118 need not, however, be of equal-size or be regularly-spaced. Rather, the nodes 118 may vary in size, shape, spacing or other characteristics in different regions of the membrane 112 to provide localized control over the support characteristics of the membrane 112 in the different regions. Although the nodes 118 of this embodiment are substantially square, they may vary in shape from application to application. For example, circular, triangular, rectangular or irregular shapes nodes may be desired in certain applications. The illustrated nodes 118 have a generally planar upper surface 124, but the upper surface 124 may be contoured. For example, the nodes 118 may have a convex upper surface (not shown). It should also be recognized that the spaces 126 defined between the nodes 118 and the connector segments 120, 122 provide a ventilated membrane 112. The size, shape and configuration of the spaces 126 can be tailored to provide the desired balance between ventilation and support characteristics.

As noted above, the nodes 118 are interconnected by a plurality of connector segments 120, 122 (See FIG. 2B). The support characteristics of the membrane 112 are affected by the number, size, shape and other characteristics of the connector segments 120, 122. In this embodiment, the membrane 110 configured to provide elastic support along one direction. Accordingly, the connector segments 120 joining the nodes 118 in the oriented direction x are substantially planar. As a result, the elastomeric membrane 112 undergoes a stretching action in the direction of orientation when a load is applied. In this embodiment, the membrane 112 is configured to have minimal elastic response in the y direction (i.e. the direction perpendicular to the oriented direction). Accordingly, the connector segments 122 joining the nodes 118 in the y direction are generally non-planar following a somewhat U-shaped arc. As a result, the connector segments 122 provide the membrane with "slack" in the direction perpendicular to the oriented direction. Under load, the non-planar connectors 122 undergo a bending action that essentially flats the connectors taking the "slack" out of the membrane 112. This permits the membrane 112 to undergo a certain amount of expansion in the direction of the slack without stretching of the membrane 112. The amount of load required to achieve this expansion can be built into the membrane 112 by tuning the design and configuration of the connector segments 120, 122. Although the precise force required to achieve the bending action will vary, the bending action generally provides significantly less resistance to the expansion of the membrane 112 and less elastic return than would normally result from a stretching action. As a result, the membrane 112 provides elastic support primarily in the direction of orientation. As shown in FIGS. 2A and 2B, the membrane 110 includes a plurality of channels extending across the membrane in the x-direction between each rows of nodes 118 and above the non-planar connectors 122.

Figure 10:
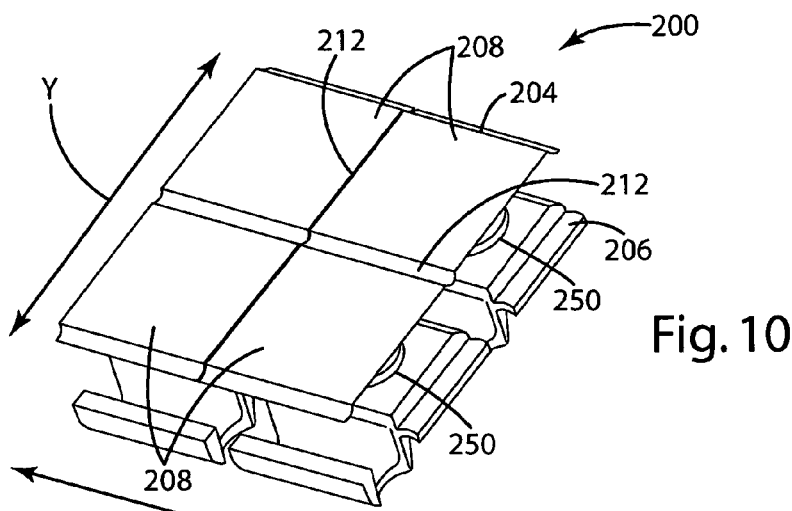
FIG. 10 is an enlarged perspective view of a portion of the load bearing surface of FIG. 9.
Figure 9:
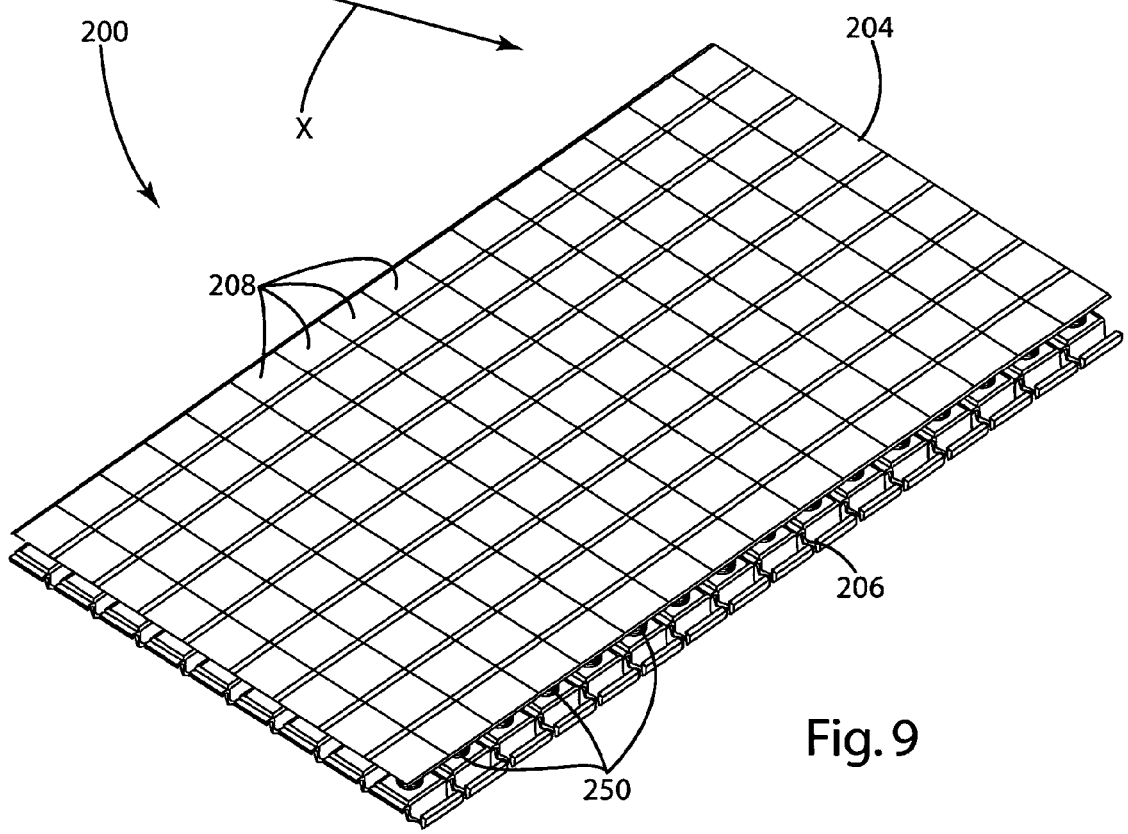
FIG. 9 is a perspective view of a two layer load bearing surface in accordance with one embodiment of the present invention.
Figure 11:
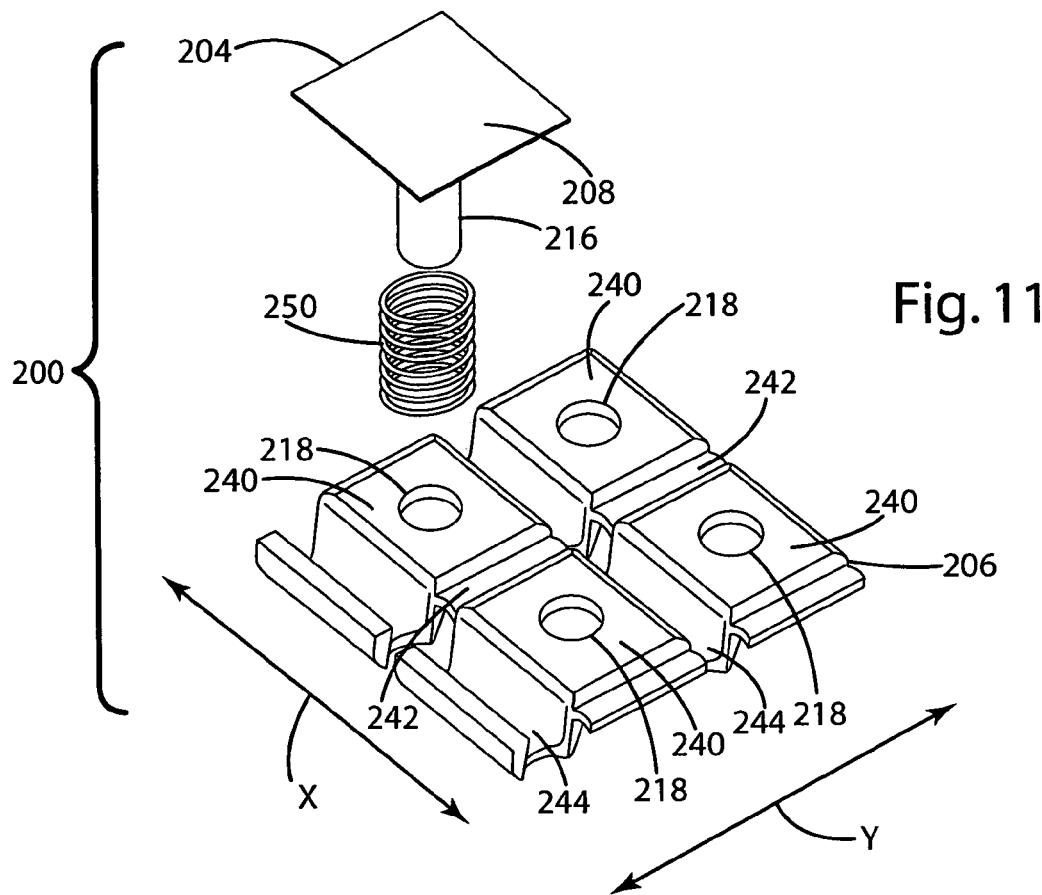
FIG. 11 is an exploded of the load bearing surface showing a single spring and single node and a portion of the lower layer

In another aspect, the present invention provides a multilayer load bearing surface 200. In the embodiment of FIGS. 9-11, the load bearing surface 200 includes an upper layer 204 having a plurality of loosely connected nodes 208, a lower layer 206 that interfaces with and supports the upper layer 204 and a plurality of spring elements 230 interposed between the upper layer 204 and the lower layer 206. In one embodiment, the upper layer 204 includes a plurality of interconnected nodes 208. The upper layer 204 may be a single molded sheet formed with integral connector segments 212 that interconnect adjacent nodes 208. In the embodiment of FIGS. 9-11, the nodes 208 are square. But, the nodes 208 may be of other shapes. For example, in the alternative embodiment of FIGS.

Figure 16:
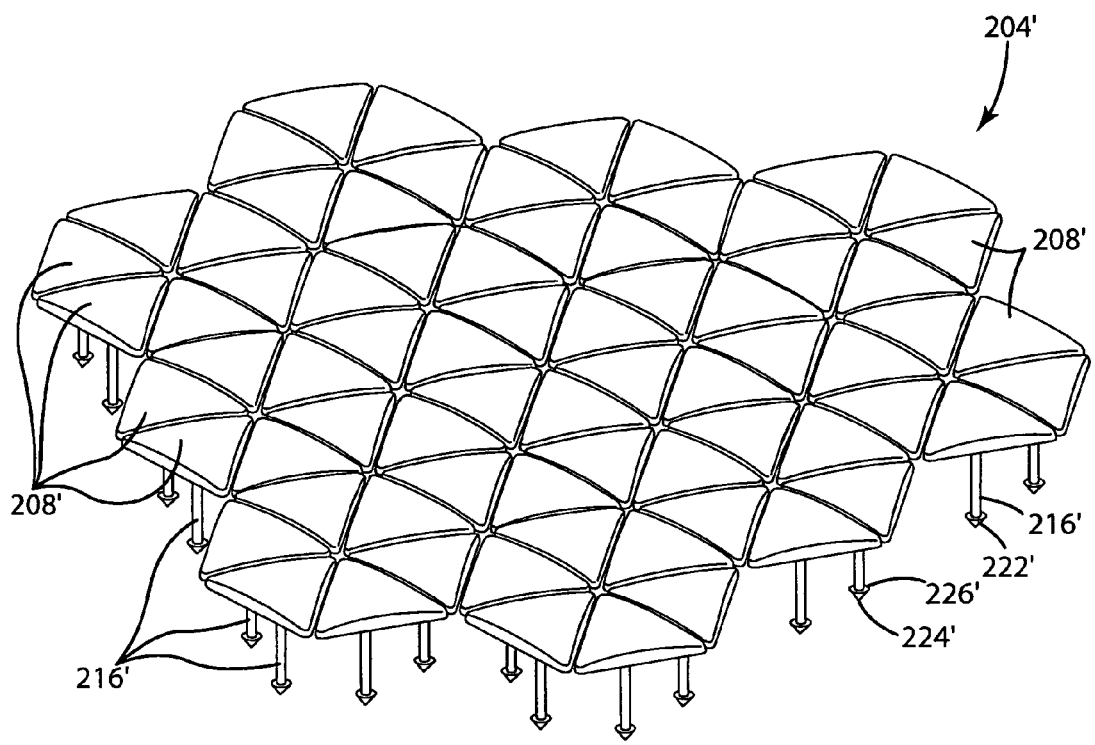
FIG. 16 is a perspective view of an alternative top layer with triangular nodes.
Figure 17:
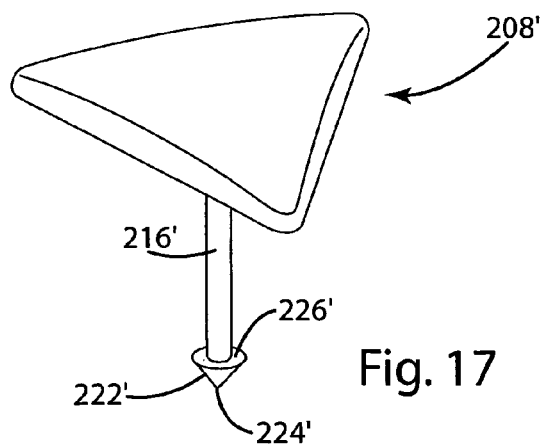
FIG. 17 is a perspective view of a single node of the alternative top layer of FIG. 16.

16-17, the nodes 208' are triangular. The characteristics of the connector segments 212 are selected to provide the desired level of interdependence between adjacent nodes 208. For example, relatively short, thick connector segments 212 may be included when a high degree of interdependence is desired between the nodes 208 and longer or thinner connector segments 212 may be included when a high degree of independence is desired. If desired, the connector segments 212 can be curved to the provide "slack" between the nodes 208, similar to the connector segments 122 described above in connection with membrane 10. In the illustrated embodiment, the upper layer 204 further includes an axel 216 (or other protrusion) extending from each node 208 toward the lower layer 206. As described in more detail below, the axels 216 are interfitted with corresponding openings 218 in the lower layer 206. The interfitted relationship permits the lower layer 206 to shepherd movement of the upper layer 204. The axels 216 may have various shapes. But, in the embodiment of FIGS. 9-11, each axel 216 includes an elongated cylindrical shaft. In the alternative embodiment, shown in FIGS. 16 and 17, each axel 216' generally includes a shaft 220' terminating in a head 222'. The head 222' is an inverted cone having a tapered lower end 224' that facilitates insertion of the axel 216' into the corresponding opening in the lower layer and a substantially flat upper end 226' that resists removal of the axel 216' from the opening in the lower layer. The axel head 222' permits the upper layer 204' and the lower layer to be easily snap-fitted into an interlocking relationship. The head 222' may alternatively include other interlocking shapes.

The lower layer 206 provides a support structure for the upper layer 204. The lower layer 206 is optionally elastic and is optionally segregated into nodes 240 corresponding with the upper layer nodes 208. In the embodiment of FIGS. 9-11, the lower layer 206 is a decoupled, molded elastic membrane similar to membrane 112 described above. The lower layer 206 includes a plurality of square nodes 240 that are interconnected by connector segments 242, 244. As with membrane 112, the lower layer 206 is oriented in the x direction and includes non-planar connector segments 224 that provide slack in the y direction. Unlike membrane 112, however, each node 240 defines an opening 218 adapted to receive the axel 216 of the corresponding upper layer node 208.

Figure 12:
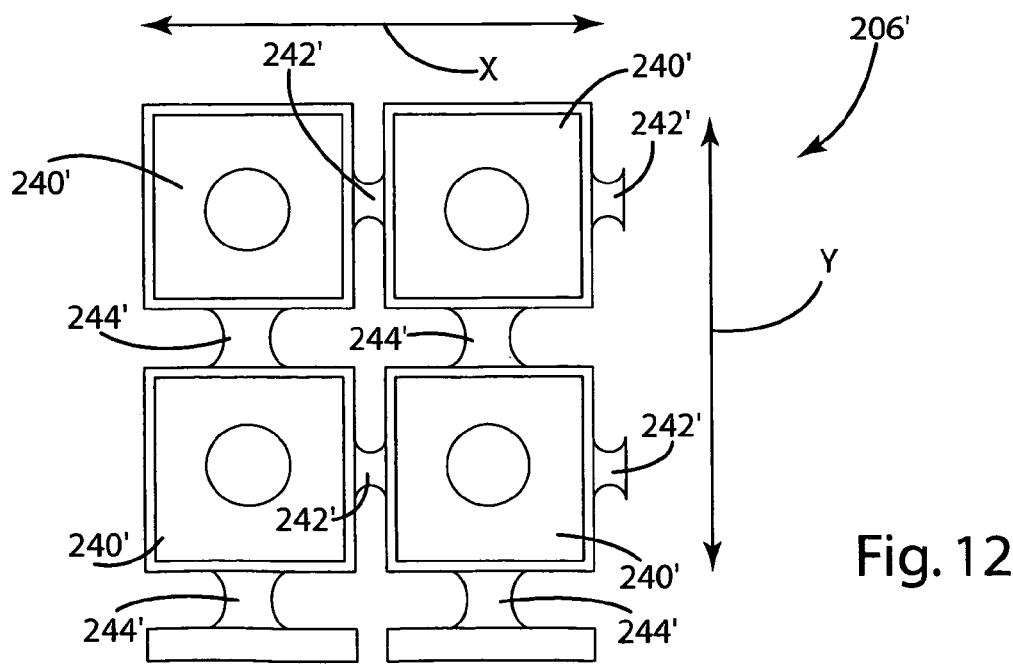
FIG. 12 is a top plan view of an alternative lower layer.
Figure 13:
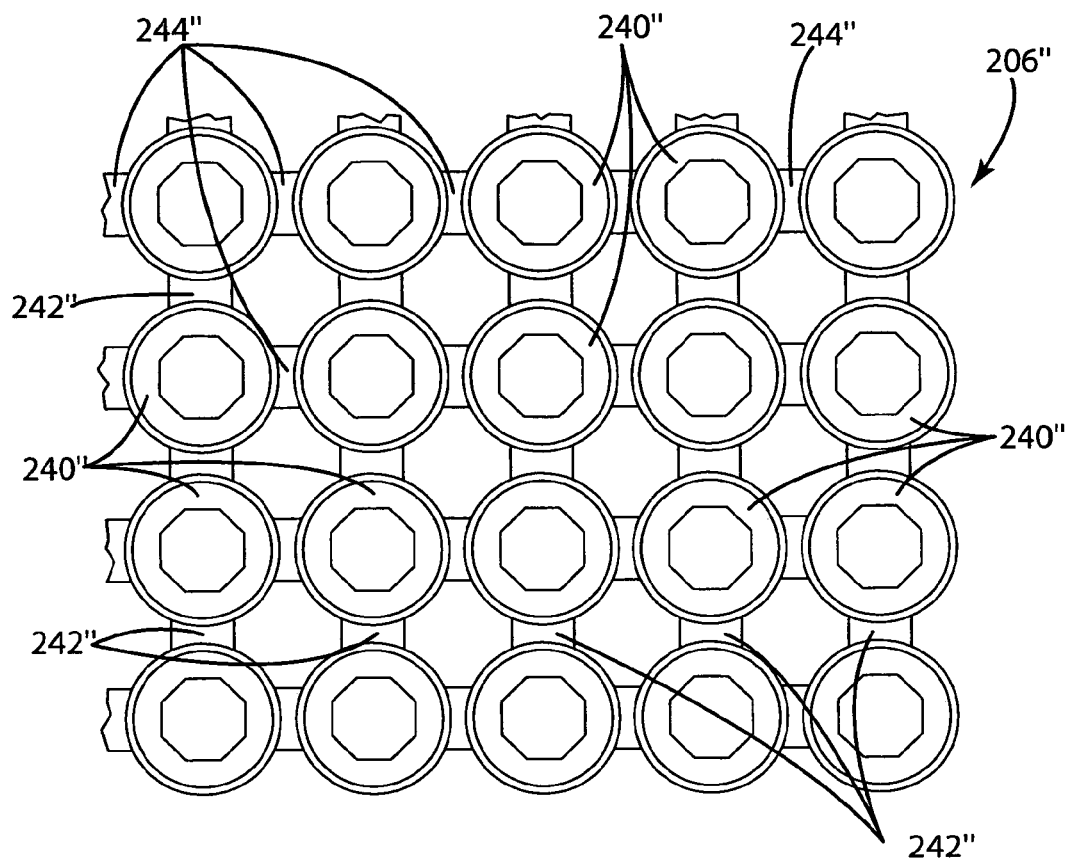
FIG. 13 is a top plan view of a second alternative lower layer.

The configuration of the nodes 240 and connector segments 242, 244 may vary from application to application. A first alternative lower layer 206' is shown in FIG. 12. In this embodiment, the lower layer 206' is oriented in the x direction. The lower layer 206' includes square nodes 240' that are interconnected by connector segments 242', 244'. The connector segments 242' link the nodes 240' in the x direction and are essentially planar to provide no slack in the oriented direction. The connector segments 244' link the nodes 240' in the y direction and are arcuate to provide slack in the y direction. A second alternative lower layer 206" is shown in FIG. 13. This embodiment is essentially identical to lower layer 206', except that the nodes 240" are generally circular. As with lower layer 206', the connector segments 242", 244" of lower layer 206" may provide slack in the y direction, if desired. Although the lower layer is described in connection with various oriented constructions, it is not necessary for the lower layer to be oriented or otherwise decoupled. Similarly, the lower layer 206 need not be segregated into distinct nodes.

As noted above, spring elements are interposed between the upper layer 204 and the lower layer 206. Preferably (but not necessarily), a spring element 250 is disposed between each upper layer node 208 and the corresponding lower layer node 240. As shown in FIGS. 9-11, spring elements, such as a coil spring, may be fitted over each axel 216 disposed between the upper layer 204 and lower layer 206. The characteristics of the separate springs may vary from location to location to provide different support characteristics in different portions of the load bearing surface.

Figure 14:
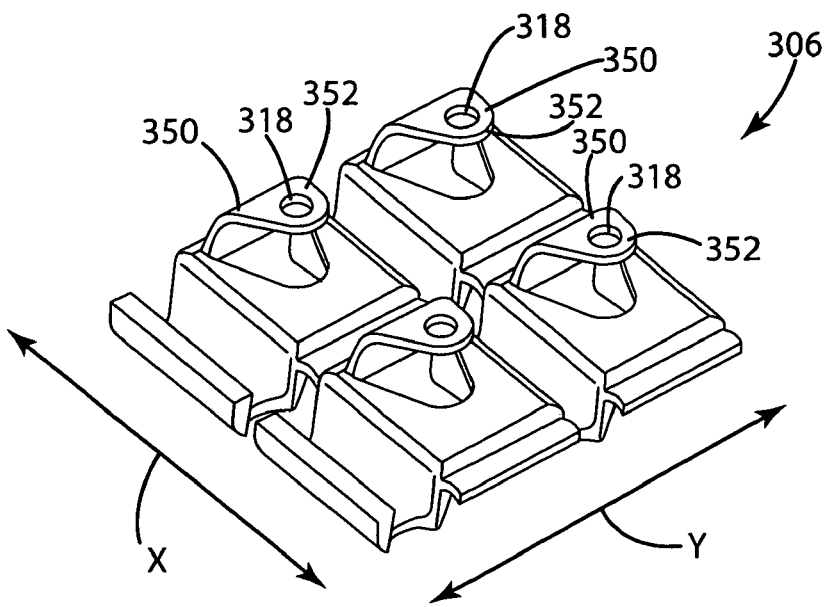
FIG. 14 is a perspective view of an alternative lower layer with an integral spring element.

The spring elements may alternatively be integrated into the lower layer. As show in FIG. 14, the lower layer 306 may include a plurality of integral spring arms 350 that are integrally molded with the lower layer 306. The spring arms 350 are arranged so that a single spring arm 350 is uniquely aligned with each of the upper layer nodes 208. The spring arms 350 are cantilevered and are generally arcuate extending from the lower layer 306 toward the upper layer 204. The upper end 352 of each spring arm 350 is configured to engage the undersurface of the corresponding upper layer node 208. Each spring arm 350 defines an axel opening 318 configured to receive the axel 216 of the corresponding upper layer node 208. In this embodiment, the axel opening 318 is smaller than the head of the axel so that the axel snap-fits into the spring arm 350. The arcuate spring arms 350 can be replaced by other cantilevered or otherwise resilient structures, such as arches or domes.

Figure 15:
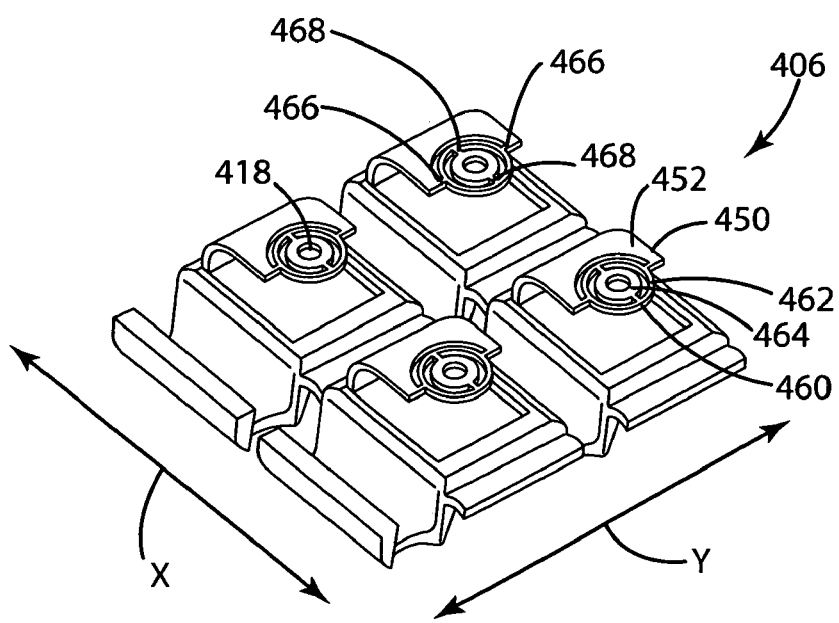
FIG. 15 is a perspective view of a second alternative lower layer with an integral spring element.

An alternative integral spring construction is shown in FIG. 15. In this embodiment, the spring elements 450 each include an integral gimbal 460 that facilitates movement of the axel 216 in essentially any direction, thereby giving the upper layer 204 more flexibility. The spring element 450 includes a cantilevered arm 452 extending from the lower layer 406 toward the upper layer 204. The spring arm 450 terminates in an integral gimbal 460. The gimbal 460 generally includes a pivot ring 462 and a mounting ring 464. The pivot ring 462 is connected to the remainder of the spring arm 450 by a pair of flexible bridges 466. The bridges 466 are diametrically opposed to one another on opposite sides of the pivot ring 462. The pivot ring 462 is in turn connected to the mounting ring 464 by a pair of flexible bridges 468. The mounting head bridges 468 are diametrically opposed to one another on opposite sides of the mounting ring 464 and are offset approximately ninety degrees from the pivot ring bridges 466. In use, the pivot ring bridges 466 and mounting ring bridges 468 are sufficiently flexible to permit the mounting ring 464 to pivot in essentially any direction as may be dictated by the load transferred by the axel 216. The characteristics of the gimbal 460 can be tuned to provide the desired support characteristics.

In yet another alternative embodiment, the spring elements may be incorporated into the upper layer rather than the lower layer. In this embodiment, the spring element may be essentially identical to the spring elements described above.

The lower layer can be readily configured to provide localized control over the support characteristics of the load bearing surface. If desired, the characteristics of the spring elements may be varied in different regions of the lower layer to provide corresponding variations in the support characteristics in the different regions. For example, the stiffness of select spring elements may be increased or decreased to provide greater or lesser support, as desired. The shape, thickness, length or other characteristics of the spring elements may be varied to provide the desired localized control.

The above description is that of various embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A load bearing surface comprising a molded elastomeric membrane, said membrane being molded such that it is decoupled between a first direction and a second direction by a mechanical structure, whereby said membrane provides different load bearing characteristics in said first direction and said second direction, said membrane being oriented in said second direction to at least partially crystallize said membrane in said second direction.

2. The surface of claim 1 wherein said first direction is angled approximately ninety degrees from said second direction.

3. The surface of claim 1 wherein said membrane includes an integral edge adapted to permit mounting of said membrane to said support structure.

4. The surface of claim 1 wherein said mechanical structure includes a plurality of contours integrally formed with said membrane.

5. The surface of claim 1 wherein said mechanical structure includes a plurality of apertures defined in said membrane, said apertures being elongated in substantially said first direction.

6. The surface of claim 1 wherein said mechanical structure includes a plurality of ribs integrally formed with said membrane, said ribs extending in substantially said first direction.

7. The surface of claim 1 wherein said mechanical structure includes a plurality of sinusoidal variations integrally formed with said membrane, said variations extending in substantially said first direction.

8. A method for manufacturing a load bearing surface, comprising:

molding an elastomeric membrane, such that the molded membrane includes a mechanical structure decoupling the membrane between a first direction and a second direction, wherein the molding includes forming a plurality of nodes in the membrane that are interconnected by a plurality of connectors, the connectors extending in the first direction having different physical characteristics than the connectors extending in the second direction, wherein the connectors extending in the first direction are non-planar to provide the membrane with slack in the first direction; and orienting the membrane until the crystalline structure of the membrane has a greater degree of alignment in the second direction.

9. A load bearing surface comprising a molded elastomeric membrane, said membrane being molded such that it is decoupled between a first direction and a second direction, whereby said membrane provides different load bearing characteristics in said first direction and said second direction, wherein said membrane includes a crystalline structure having a greater degree of alignment in said first direction than in other directions, and wherein said membrane includes a mechanical structure decoupling said membrane in said second direction.

10. The load bearing surface of claim 9 wherein said membrane is adapted to be suspended from a support structure.

11. The load bearing surface of claim 10 wherein said membrane includes an integral edge adapted to permit mounting of said membrane to said support structure.

* * * * *